March 24, 1931. W. S. GRAHAM 1,797,863
TRACTOR CULTIVATOR
Filed Nov. 29, 1929 3 Sheets-Sheet 1

Inventor
William S. Graham
By H. P. Doolittle
Atty.

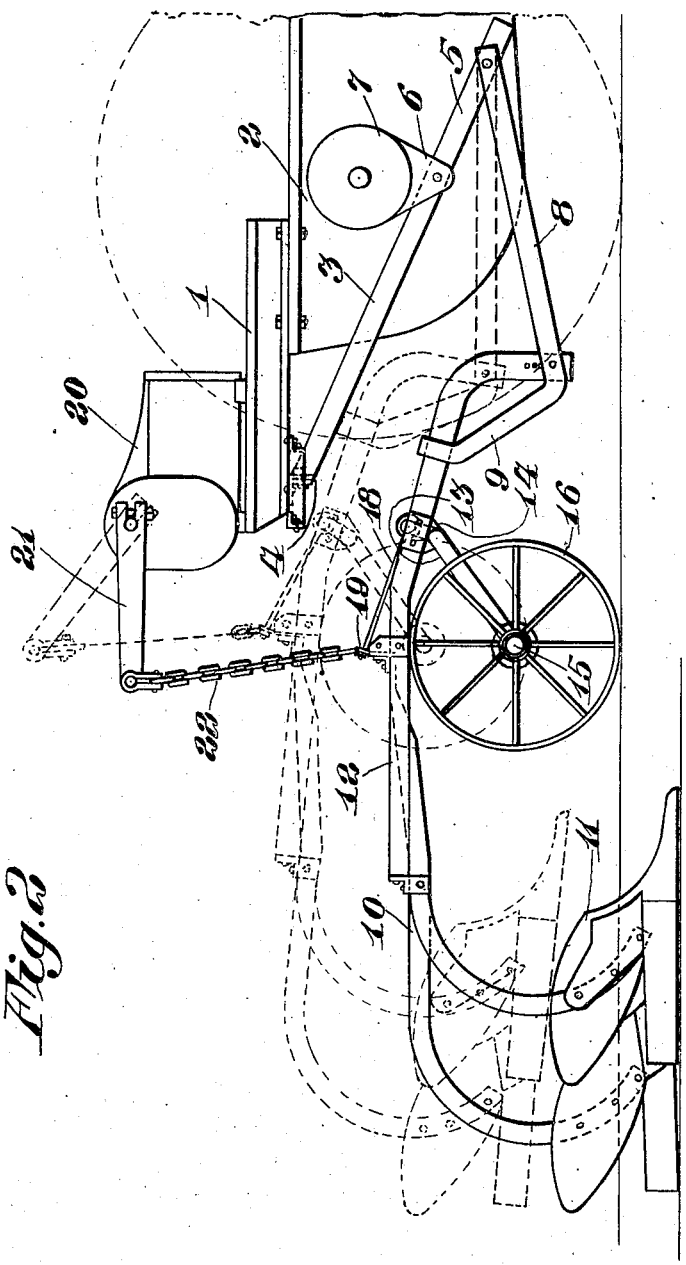

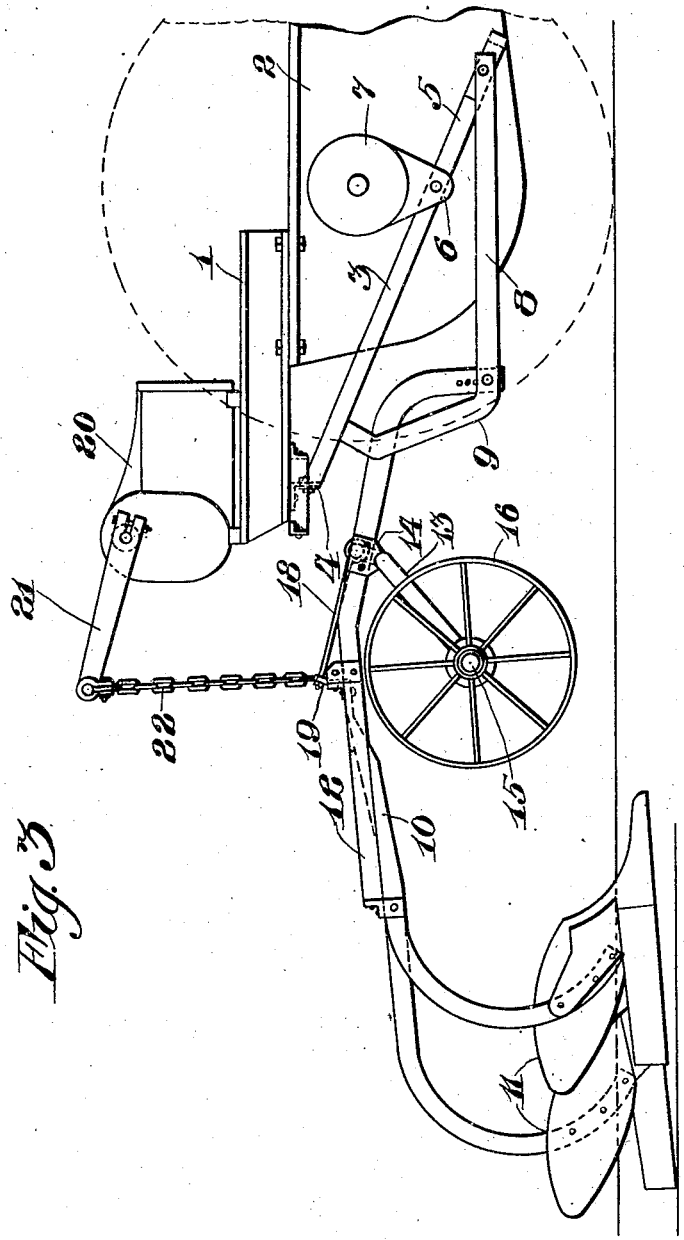

Patented Mar. 24, 1931

1,797,863

UNITED STATES PATENT OFFICE

WILLIAM S. GRAHAM, OF CANTON, ILLINOIS, ASSIGNOR TO INTERNATIONAL HARVESTER COMPANY, A CORPORATION OF NEW JERSEY

TRACTOR CULTIVATOR

Application filed November 29, 1929. Serial No. 410,330.

This invention relates to a cane cultivator. More specifically it relates to a tractor drawn cultivator particularly adaptable for operating over uneven ground and to means for lifting the cultivator out of operative position.

The principal object of the invention is to provide novel and improved means for flexibly securing a cultivator in trailing relationship behind a tractor and cooperating means for lifting the cultivator with its associated elements out of operative position and out of engagement with the ground.

Another object is to provide a novel suspension and draft linkage which holds the cultivator against lateral swinging movement but permits horizontal flexibility of the cultivator while in operative position and rigidly holds said cultivator in lifted or suspended position.

Other objects will be apparent in the detailed description to follow.

The objects of the invention are accomplished by pivotally connecting a floating frame structure on which the cultivator is mounted to one end of a second frame structure pivotally secured to a support rigid with respect to the tractor. A power operated vertical lifting means mounted on the tractor is attached to the cultivator frame structure at a point forward from its center of gravity. It will be understood, by this construction, that the front of the cultivator frame will be first raised by application of power to the lifting means. This movement rotates the front frame structure about its point of attachment to the tractor. A stop is provided to limit this upward rotation of the front frame. The axis on which the cultivator frame is hinged to the front frame then becomes stationary, and the rear of the cultivator frame is lifted clear from the ground.

The construction and operation of the tractor cultivator is shown in detail in the drawings, in which:

Figure 2 is an elevation showing the cultivator in operative position in solid lines, and in lifted position in dotted lines; and, Figure 3 is an elevation showing the position of the cultivator frame in an intermediate stage of the lifting operation.

Figure 1:
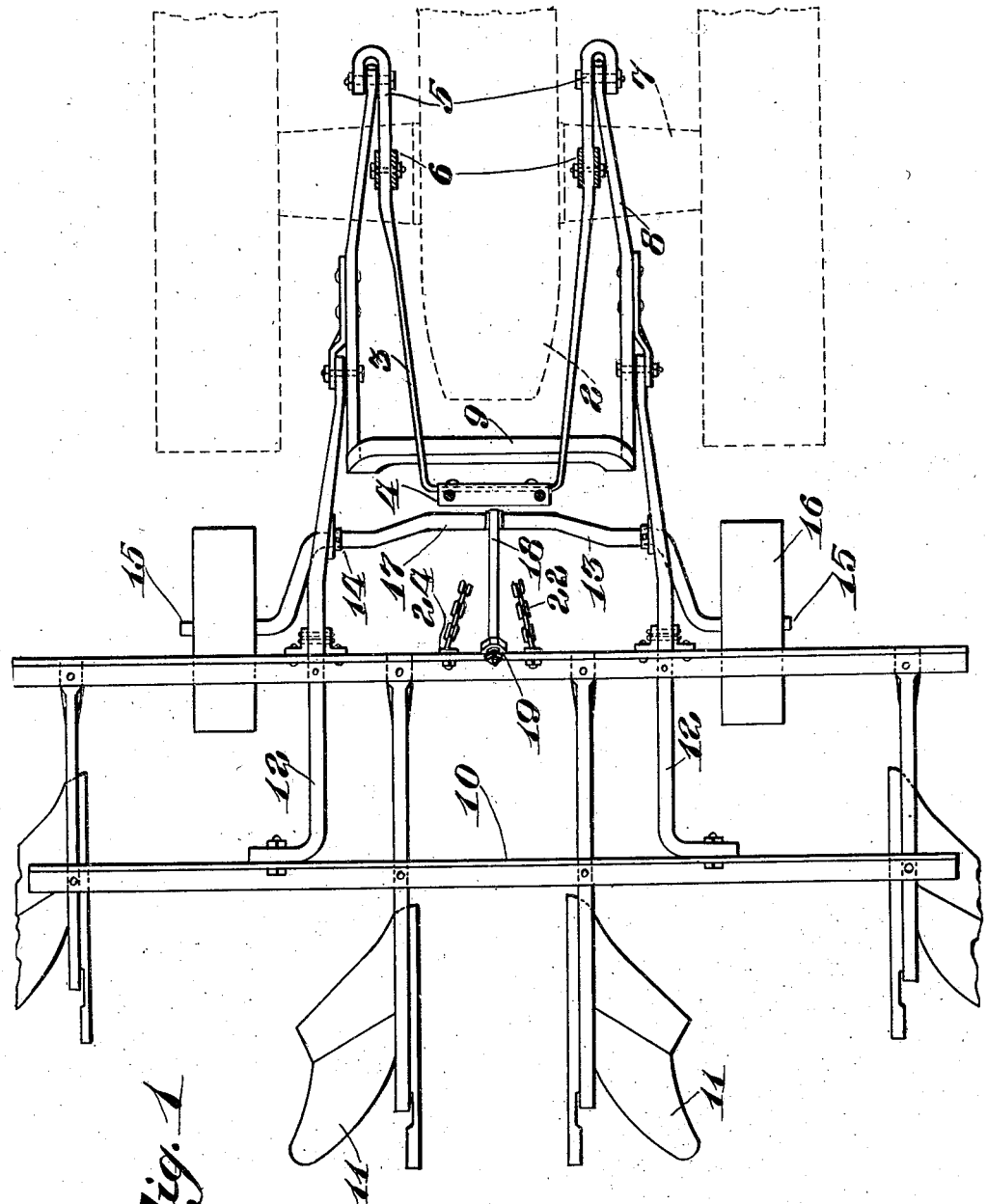
Figure 1 is a plan view showing the cane cultivator of the invention and a portion of a tractor in dotted lines, to which the cultivator is adapted to be attached.

The supporting structure for the cane cultivator of this invention is adapted to be rigidly secured to a tractor. Rearwardly extending supports 1 are secured to the main tractor frame 2 in a horizontal position. A forwardly and downwardly extending arched member 3 is secured at the top of the arch to an angle bar 4, which is in turn rigidly attached to the supports 1. The ends 5 of the arched member 3 extend under the rear axle of the tractor and are secured thereto by spaced lugs 6 depending from the axle housings 7. The horizontal supports 1 and the arched member 3 make up the supporting structure to which the cane cultivator is secured.

A draft frame consisting of side members 8 and an integrally arched portion 9 connecting said members is pivotally hinged at the forward ends of the members 8 to the forward ends of the arched member 3. The draft frame is wider and shorter than the arched member 3. The arched portion 9 of the draft frame is substantially horizontal and is adapted to abut against the arched member 3 when rotated upwardly toward said member.

As best shown in Figure 1, the cultivator consists of a main frame 10, to which a series of plows 11 are secured. Two spaced draft bars 12 rigidly secured to the frame 10 extend forwardly and are pivotally joined to opposite sides of the draft frame side members 8. The forward end of the draft bars 12 are bent downwardly for a purpose to be hereinafter described.

A shaft 13 is rotatably mounted in bearing blocks 14 rigidly secured to the draft bars 12. The outer ends of the shaft 13 beyond the bearing blocks are bent downwardly and are provided with axles 15 on which wheels 16 are mounted. The central part of the shaft 13 is bent upwardly to form a crank portion 17. An I-bolt 18 is secured to the crank portion 17 of the shaft and to an upstanding extension 19 on the main frame 10.

A hydraulic power lift 20 is mounted on the supports 1 attached to the tractor. As the power lift is not a part of this invention, it is shown only diagrammatically. An operating arm 21 extends rearwardly from the power lift to a point substantially vertically above the front of the main cultivator frame 10. A pair of chains 22 connect the lever arm 21 with spaced lugs 24 secured to the main frame 10.

In the operation of this device the cultivator is lowered into position by dropping the lever arm 21 of the power lift 20. The power for pulling the cultivator is transmitted through the side members 8 of the draft frame to the draft bars 12 on the main cultivator frame 10. The wheels 16 rest on the ground and regulate the depth of the lister plows 11. The position of the wheels 16 with respect to the frame 10, and consequently the depth at which the plows operate, may be varied by adjusting the length of the I-bolt 18.

As the draft frame is pivoted at both ends, the cultivator frame is substantially free to follow the contour of the ground being operated on. This action is modified somewhat by the low point on the downwardly bent draft bars 12 to which the draft frame is pivoted. By applying the draft at this point, the plows are prevented from attaining an undesirable depth when the wheels cross a ditch or similar depression.

When the cultivator is to be raised, the lever arm 21 of the power lift is rotated upwardly. The cultivator frame is tilted upwardly at the front, as the point of attachment of the chains 22 on the frame 10 is forwardly from the center of gravity of the cultivator and its associated elements. The draft frame is also tilted upwardly until the arched portion 9 engages the arched member 3. In this position, the wheels are lifted off the ground with the plows tilted upwardly, as shown in Figure 3.

Vertical movement of the lever arm 21 is continued. The axis on which the draft bars 12 are pivoted to the draft frame on the members 8 is now stationary with the result that the main cultivator frame is rotative about this axis. The upward movement of the arm 21 is continued until the lister plows are lifted clear of the ground, as shown in dotted lines in Figure 2. The limiting position is reached when the cultivator frame engages the supporting structure mounted on the tractor.

Although applicant has shown his invention as utilized in a cane cultivator, it is to be understood that its use is contemplated wherever the functions which it performs are found desirable.

The claim to invention is, therefore, limited only by the scope of the appended claims.

What is claimed is:

1. In a tractor drawn implement, a supporting structure adapted to be rigidly secured to the tractor, a draft frame hinged on a horizontal axis to the supporting structure, said draft frame having an upwardly extending arched portion adapted to abut against the supporting structure upon upward rotation of the frame about its hinging axis, an implement frame pivotally secured to the rear of the draft frame, lifting means mounted on the tractor, and a connection between said means and a point on the implement frame forward from its center of gravity.

2. In a tractor drawn cane cultivator, a supporting structure adapted to be rigidly secured to the tractor, said structure having a portion extending downwardly and forwardly under the rear axle of the tractor, a draft frame hinged on a horizontal axis to the forward end of the supporting structure, said draft frame having an upwardly extending arched portion at the rear end thereof adapted to abut against the supporting structure upon upward rotation of the frame about its axis, a cultivator frame pivotally secured to the rear end of the draft frame, a wheeled truck support attached to the front of the cultivator frame, cultivator shovels attached to the rear of said frame, lifting means mounted on the supporting structure, an actuating lever extending rearwardly from said lifting means, and a lifting connection between said lever and a point on the cultivator frame forward from the center of gravity of said frame and its associated elements.

3. In a tractor drawn implement, a supporting structure adapted to be rigidly secured to the tractor, said structure having a portion extending downwardly and forwardly under the rear axle of the tractor, a draft frame hinged on a horizontal axis to the forward end of the supporting structure, said draft frame having an upwardly extending arched portion at the rear end thereof adapted to abut against the supporting structure upon upward rotation of the frame about its axis, an implement frame pivotally secured to the rear end of the draft frame, a wheeled truck support attached to the front of said frame, soil working means attached to the rear of said frame, lifting means mounted on the supporting structure, an actuating lever extending rearwardly from said lifting means, and a lifting connection between said lever and a point on the cultivator frame forward from the center of gravity of said frame and its associated elements.

In testimony whereof I affix my signature.

WILLIAM S. GRAHAM.